United States Patent Office 3,273,043
Patented Sept. 13, 1966

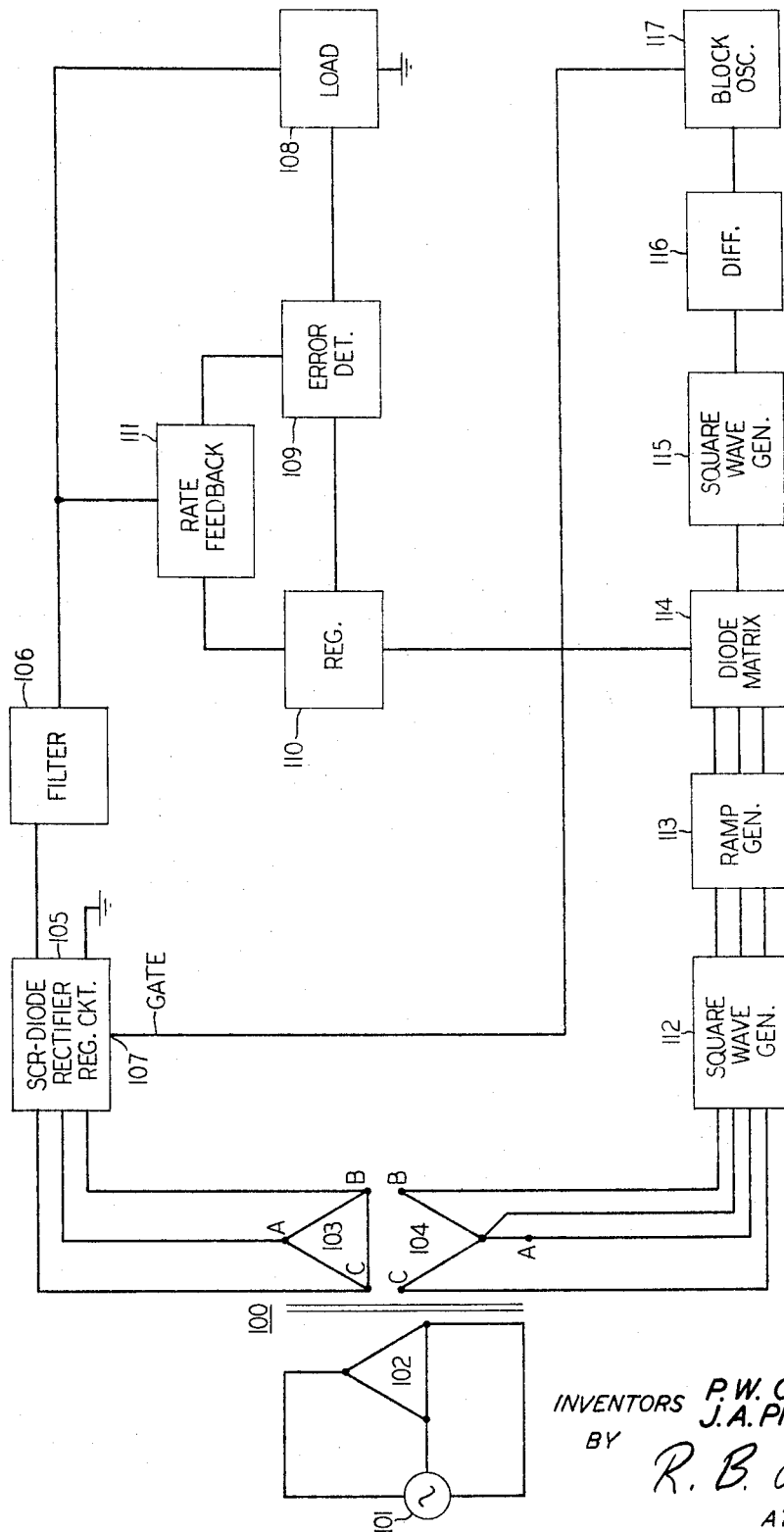

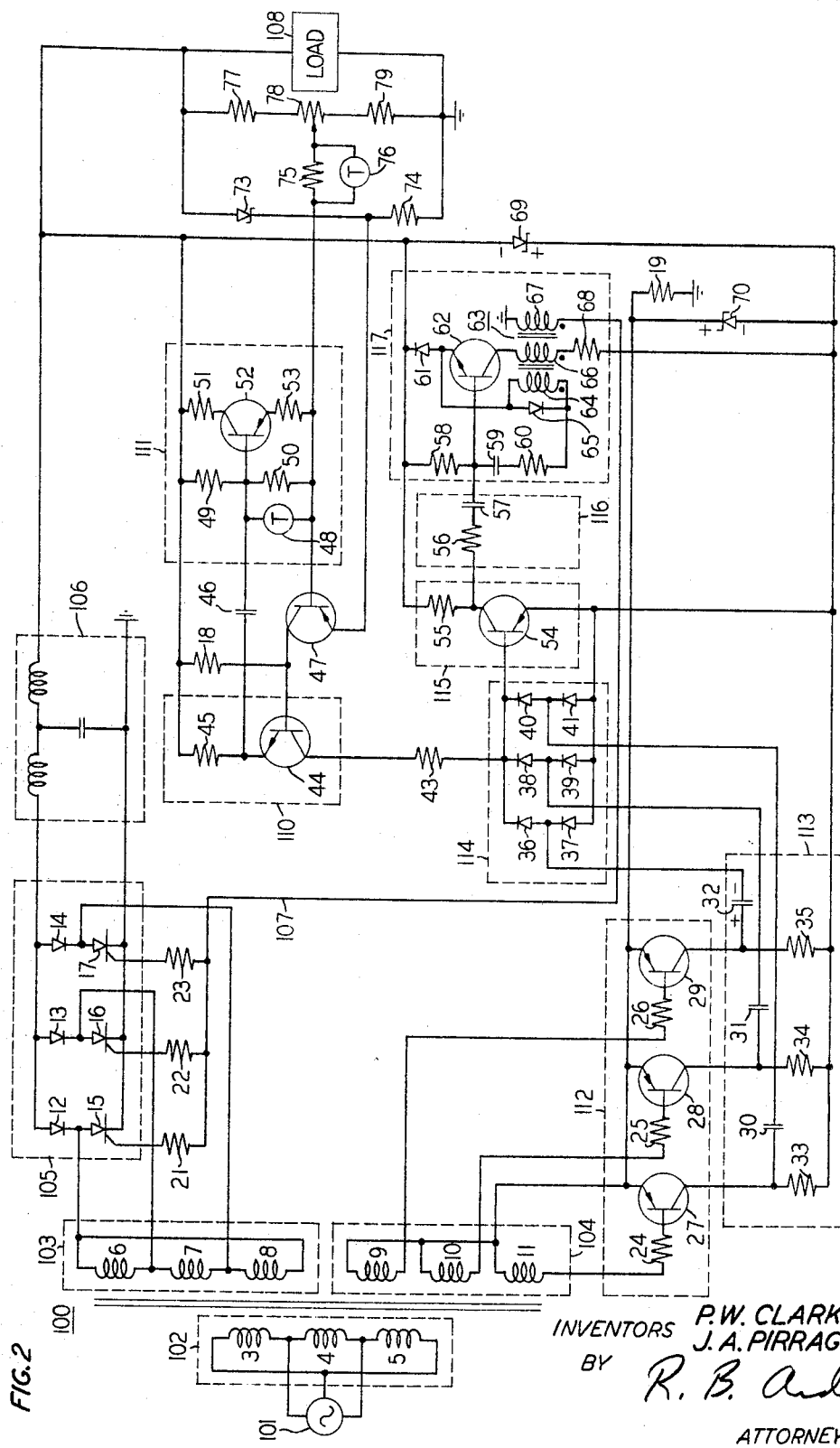

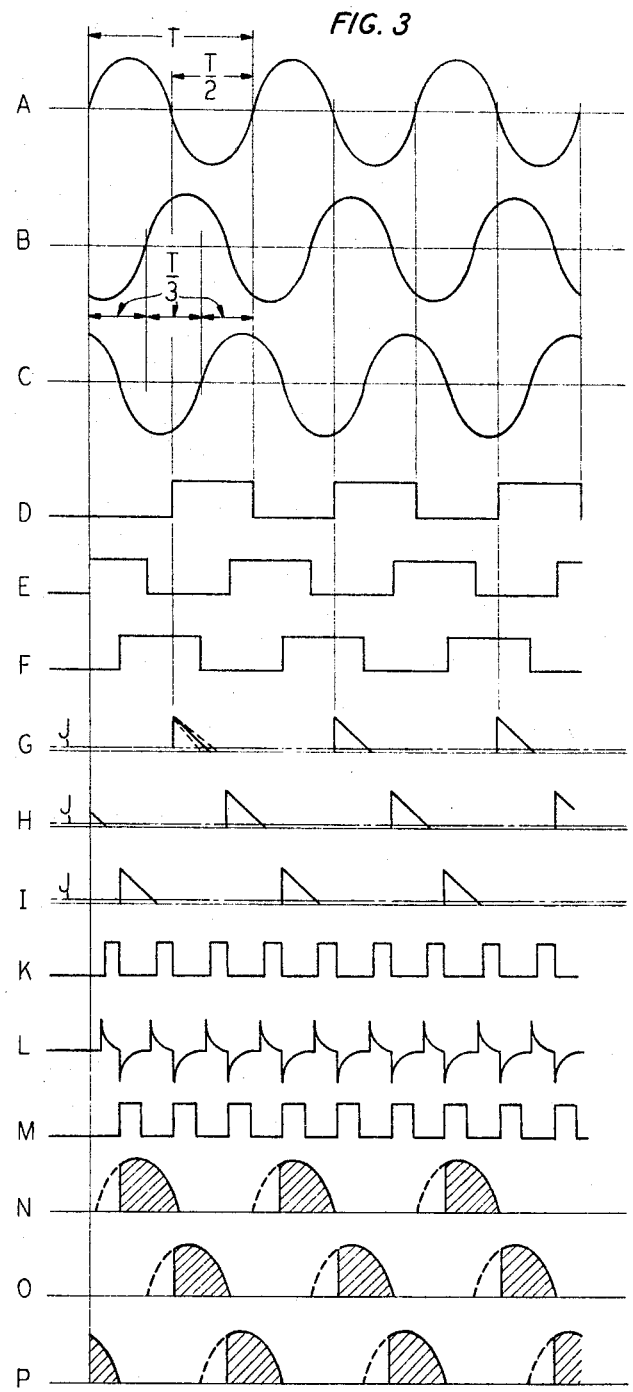

3,273,043
REGULATED RECTIFIER
Patrick W. Clarke, Jackson Heights, and Joseph A. Pirraglia, New York, N.Y., assignors to Bell Telephone Laboratories, Incorporated, New York, N.Y., a corporation of New York
Filed July 2, 1962, Ser. No. 206,571
16 Claims. (Cl. 321—18)

This invention relates to rectifier circuits and more particularly to single or multiphase rectifier circuits wherein voltage regulation is employed.

Rectifiers employing voltage and current regulation are numerous in the prior art. Usually an output voltage controlled impedance element is operated in the active region (i.e., between the cut-off and saturation regions without going into either) and is serially connected between the source of potential and the load. The impedance of, hence the voltage drop across, the impedance element varies in accordance with load voltage variations to maintain a constant voltage across the load. The impedance element may be thought of as a variable resistor which absorbs the difference between the source and the load potentials. Accordingly, this regulating element dissipates large amounts of power and requires means to remove the heat inherently generated. The efficiencies of such regulator-rectifiers are, therefore, limited even under optimum conditions.

The prior art has also taught single and multiphase regulator rectifiers wherein thyratrons were switched in accordance with a feedback load voltage error signal to obtain voltage regulation. Such circuits, especially in multiphase applications, necessitated elaborate hence expensive and relatively unreliable control circuits to control the "firing" of the regulating thyratron tube in accordance with load voltage variations. Since regulation was achieved by controlling the relative conductive and nonconductive periods of the regulating thyratron tubes, the quality and efficiency of regulation were greatly impaired. These prior art circuits also found difficulty in compensating for phase magnitude and angle unbalance in the input alternating-current source which further decreased the quality and efficiency of regulation. Although it was recognized that high speed switching rates were more efficient, the above noted limitations prevented prior art circuits from obtaining these speeds.

One object of this invention is, therefore, to increase the efficiency with which rectified voltage and currents may be regulated.

A closely related object is to do so as simply, reliably and inexpensively as possible without restricting the applicability of the regulator.

The present invention is a single or three-phase silicon controlled rectifier power supply wherein load current flows in each phase only during the conduction interval of the controlled rectifier associated therewith. A source controlled square wave generator is used in combination with a load error voltage controlled current sink to control the firing of a blocking oscillator which, in turn, provides the firing signals to the controlled rectifiers. The point at which each of the controlled rectifiers "fires" is determined by the combination of the firing signals and the variations of the alternating-current source. Determining the firing time in this manner, using solid state controlled circuitry, affords a means of developing a high-speed switching regulator to regulate the output of the rectifier with a high degree of precision and efficiency. Rate feedback is added in such a manner as to stabilize the load error voltage feedback network in the event of phase, magnitude or angle unbalance in the input alternating-current supply without greatly sacrificing the transient response of the regulator.

The nature of the invention and its distinguishing features and advantages will be more clearly understood from the detailed description and the accompanying drawings, FIG. 1 of which is a block diagram of the present invention;

FIG. 2 of which is a schematic representation of the invention; and

FIG. 3 is the current and voltage waveshapes appearing at noted points in FIGS. 1 and 2.

The operation of the circuit can best be understood by referring to the block diagram of FIG. 1. A three-phase source of alternating-current 101 is connected to a three-phase transformer 100, the primary windings 102 of which are delta connected. Transformer 100 has two sets of secondary windings 103 and 104, the former of which is delta-connected while the latter is Y-connected. The delta-connected secondary 103 of transformer 100 is connected to a high speed switching silicon controlled rectifier-diode regulated rectifier circuit 105. The controlled rectifiers are fired in accordance with a gate signal 107 and the alternating-current supply, as discussed hereinafter. The output of the regulated rectifier circuit 105 is fed to a filter 106 which, in turn, feeds a load 108. The difference (error) between the load voltage and a predetermined reference standard is sampled by error detector 109 which, in turn, controls regulator 110. Circuit stability in regulator 110 and error detector 109 is achieved by rate feedback 111.

The Y-connected secondary 104 of transformer 100 is connected to square wave generator 112, the output of which is fed into ramp function generator 113 the output of which is then fed into diode matrix 114. The operating level of matrix 114 and, in turn, of ramp generator 113 is determined by regulator 110 thereby achieving voltage regulation. The output of diode matrix 114 "triggers" variable width square wave generator 115 into conduction. The output of the square wave generator 115 is differentiated by network 116 which then biases blocking oscillator 117 into conduction and results in a "gate" signal output 107 which is fed to the controlled rectifier circuit 105. The controlled rectifier that is forward biased by the input signal from the delta-connected secondary winding 103 will thus be biased into conduction by the combination of the input and gate signals. The letters shown on FIG. 1 refer to the waveshapes associated with the outputs of each of the blocks of FIG. 1 and are shown on FIG. 3. The waveshapes of FIG. 3 shall also be discussed in detail hereinafter in connection with FIG. 2.

The operation of each of the "blocks" of FIG. 1 will be more easily understood by referring to the circuit which is illustrated in FIG. 2. The alternating-current source 101 is connected to the delta-connected primary windings 3, 4, and 5. The delta-connected secondary windings 103 comprise windings 6, 7, and 8. The Y-connected secondary windings 104 comprise windings 9, 10, and 11.

The transformer winding connection (delta or Y) affects both the magnitude and the phase of the induced potential. Since the magnitude of the induced potential is not essential to the present discussion, the general waveshapes of the induced potentials in windings 6, 7, 8, 9, 10 and 11 are illustrated in FIG. 3 without regard for magnitude. There is also a "leading" phase shift difference between the potentials induced in Y-connected windings 9, 10 and 11 and delta-connected windings 6, 7 and 8, respectively. This "leading" phase shift has been found to result in more efficient operation in that it is possible to obtain a greater volt-second area output than is shown in waveshapes N, O and P of FIG. 3, as will be obvious upon further consideration of the present invention. Since the operation of the circuit is, however, more easily and equally accurately described by ignoring the obvious result of the phase shift, it is left out of the following discussion in the interest of clarity. Waveshapes A, B, and C of FIG. 3 (which are 120 degrees out-of-phase with each other) are used to illustrate the induced potentials in windings 6 and 9, 7 and 10, and 8 and 11, respectively.

The operation of that portion of the circuit comprising the secondary winding 104 and "blocks" 109, 110, 111, 112, 113, 114, 115, 116, and 117 is as follows: Taking waveshape C of FIG. 3 as a typical example, we see that transistor 29 conducts and is driven into saturation when its base is biased negative with respect to its emitter, the latter being connected to the neutral of common point of windings 9, 10, and 11. The voltage waveshape at the collector of transistor 29 is shown as waveshape D on FIG. 3. (The voltage waveshapes appearing at the collector electrodes of transistors 27 and 28 are shown as waveshapes E and F, respectively, in FIG. 3.) Resistors 24, 25, and 26 are base-current limiting resistors. When transistor 29 conducts, the charging path of capacitor 32 can best be seen by treating Zener diodes 69 and 70 as series connected batteries with the polarities noted. Current thus instantly flows from the positive terminal of Zener diode 70 through the emitter-collector path of transistor 29, capacitor 32, diode 36, resistor 43, the collector-emitter path of transistor 44, resistor 45 and back to the negative terminal of Zener diode 69. The waveshape of this charging current is shown as waveshape G on FIG. 3. (The waveshapes of the charging current for capacitors 30 and 31 are shown as waveshapes H and I in FIG. 3.) The dotted lines indicate the slope the waveshape might take depending upon the magnitude of conduction of transistor 44, as shall be discussed in detail hereinafter. Again treating Zener diode 70 as a battery we see that current also flows from the positive terminal of Zener diode 70, through the emitter-collector path of transistor 29, through resistor 35 and back to the negative terminal of Zener diode 70. Since for all practical purposes the emitter-collector voltage drop across saturated transistor 29 is negligible, the potential across resistor 35 is approximately the Zener breakdown voltage of diode 70 and is thus higher than the potential to which capacitor 32 can immediately charge (due to the voltage drop across resistors 43 and 45 as well as the emitter-collector path of transistor 44 which is operating in the active region). Capacitor 32 is prevented from discharging through resistor 35 and diode 37 as long as transistor 29 continues to conduct, as discussed further hereinafter. Once transistor 29 stops conducting, however, the voltage drop across resistor 35 falls to zero, capacitor 32 quickly discharges through resistor 35 and diode 37 and the network is thus quickly ready for the next cycle of conduction of transistor 29 in keeping with the high speed switching capability of the regulator. Resistor 19 is a current-limiting resistor.

The instantaneous current flow in the charging path of capacitor 32 "back-biases" normally conducting transistor 54 and prevents conduction thereof. As the charging current of capacitor 32 decreases linearly (due to the action of transistor 44), the back-bias on transistor 54 decreases till the charging current falls to approximately the zero level (actually a few milliamperes still flow as shown by dotted line J on waveshapes G, H, and I) and transistor 54 is biased into conduction. It should be noted that at this point that transistor 54 will be forward biased by the voltage drop across diodes 36 and 37 since current will flow through discharge diode 37 once capacitor 32 charges to a potential exceeding the potential drop across resistor 35. Capacitor 32 is thus essentially "clamped" to the potential appearing across resistor 35 which, as discussed heretofore, is approximately equal to the Zener breakdown of diode 70. As shown by waveshapes G, H, I, and K, the process is repeated each time capacitors 30, 31, and 32 charge with the transistor 54 "firing" each time the current in the capacitors 30, 31 or 32 relaxes to approximately its zero value, as shown by waveshape K on FIG. 3. Waveshape K is fed into differentiator 116, which comprises resistor 56 and capacitor 57. The output of differentiator 116 is shown by waveshape L of FIG. 3 and appears at the base of transistor 62. The negative triggers shown by waveshape L bias blocking oscillator 117 into conduction. Blocking oscillator 117 is provided primarily for increased pulse power. Since in describing the operation of blocking oscillator 117 it is necessary to refer to the dot convention, it shall be defined at this time. Briefly, the dot convention refers to a means whereby the polarity of the voltage induced in a winding can be ascertained at any instant in the cycle of operation. For purposes of this description whenever a dot appears in relation to a winding the polarity of the voltage induced at the dot in that winding is of the same polarity as the voltage induced at the dot of every winding in the same magnetic field.

When a negative spike from differentiator 116 comprising resistor 56 and capacitor 57 biases transistor 62 into conduction, current will flow through current-limiting resistor 68 into the dot of winding 66 of transformer 63, through collector-emitter path of transistor 62, and through diode 61. As can be seen from the dot convention, the current induced in winding 64 biases transistor 62 further into conduction since the dot side of winding 64 is connected to the base electrode of transistor 62 through the "pulse stretcher" RC network which comprises capacitor 59 and resistor 60. Diode 65 serves to quickly dissipate the energy stored in transformer 63 when transistor 62 is biased into cut-off. Diode 61 provides a small amount of bias to prevent noise from tripping the blocking oscillator 117. Resistor 58 provides a discharge path for capacitor 57. It should be noted that when current flows in winding 66 a voltage is induced in winding 67 which is positive at the dot. The voltage induced in winding 67 provides the trigger bias for the controlled rectifiers 15, 16, and 17. It should be additionally noted that inducing a potential in winding 64 will bias transistor 62 further into conduction which, in turn, causes more current to flow through winding 66 which biases transistor 62 still further into conduction and so on. This process continues until transistor 62 saturates and there is no longer any change of current in winding 66 hence no longer any induced potential in windings 66 and 67. Since there is no longer any induced potential in windings 64 and 67, transistor 62 is driven into cut-off and the gate pulse induced in winding 67 is terminated. The output gate pulse applied to the common gate lead 107 of control rectifiers 15, 16, and 17 (which is induced in winding 67 of transformer 63) is shown as wave shape M in FIG. 3. It should be noted that transformer 63 also provides isolation in addition to the features heretofore described. Gate resistors 21, 22, and 23 are provided to insure pulse power sharing by the control rectifiers 15, 16, and 17. Without these resistors there is a possibility that one or two of the three controlled rectifiers would absorb all the pulse power due to inherent variations which arise in the manufacturing process. If such a situation should occur one or two of the controlled rectifiers would never be fired. In keeping with the overall stability and efficiency objectives of the present invention, therefore, resistors 21, 22, and 23 are provided.

It should be noted that for applications where only small amounts of firing pulse power are required, it is possible to eliminate "blocks" 116 and 117 and connect the output of step function generator 115 (collector electrode of transistor 54) directly to the common gate lead 107.

The input waveshapes to controlled rectifiers 15, 16, and 17 are shown on FIG. 3 as A, B, and C, respectively. The output waveshapes appearing at the cathode electrodes of control rectifiers 15, 16, and 17 are shown as waveshapes N, O, and P, respectively. The firing of the controlled rectifiers is achieved when the input alternating-current waveshape is in the positive volt-second region and a pulse (waveshape M) is applied to the gate electrode.

Thus, when waveshape A is positive and a pulse is applied as shown by waveshape M, controlled rectifier 15 fires and the waveshape appearing at the cathode electrode of control rectifier 15 is shown as waveshape N. Thus, current flows from the secondary winding 6 of transformer 100 through control rectifier 15, through the load 108, through filter 106, and through diodes 13 and 14 back to the alternating-current source of windings 7 and 8 depending upon the polarity of the voltage induced in the winding at a given instant. The process is then repeated as control rectifiers 16 and 17 are fired. The controlled rectifiers are turned off by the negative excursion of the alternating-current input signal.

As noted heretofore, resistors 43 and 45 and the collector-emitter path of transistor 44 control the charge rate hence the potential shown as the level J on waveshapes G, H, and I which, in turn, controls the conduction of transistor 54. By so doing it, it is possible to achieve load voltage regulation in the following manner: Assuming that the load 108 potential should decrease, the decrease in potential would also appear across the two load shunt paths, the first of which comprises resistors 77 and 79 and potentiometer 78. The second shunt path comprises Zener diode 73 and resistor 74. Since the breakdown voltage drop of Zener diode 73 will remain relatively constant, all the load voltage change will appear across resistor 74. Only a proportional part of the load voltage change will appear across the upper portion of potentiometer 78 and resistor 77 depending upon the value of resistor 79 and the lower portion of potentiometer 78. Since the emitter of transistor 47 is at the relatively constant breakdown value of Zener diode 73, however, the net effect will be to make the base of transistor 47 more negative with respect to the emitter and hence increase the emitter-base current flow of transistor 47. Resistor 75 is a base-current limiting resistor, and thermistor 76 provides temperature stability for the error detector (transistor 47). Resistor 18 is a biasing resistor. Increased collector-emitter current flow in transistor 47 in turn increases the base-emitter current flow of transistor 44. Increased base-emitter current flow of transistor 44 will also increase the collector-emitter current flow of this transistor which, in turn, as discussed previously, will increase the voltage charge rate (hence current decay rate) of capacitors 30, 31, and 32. Increasing the charge rate of these capacitors in turn biases transistor 54 into conduction earlier in time (the slope of current decay waveshape G is increased) and, as was previously discussed, will also bias the controlled rectifiers into conduction earlier in time causing current to flow through the load for a longer period of time than in the previous cycles and thereby compensating for the original decrease in load voltage.

Transistor 52 in combination with capacitor 46, resistors 49, 50, 51, 53 and 75 and thermistors 48 and 76 provide a "rate" feedback network which operates in the following manner: Since the base-emitter impedance of normally conducting transistor 44 is negligible, resistors 18 and 45 may be treated as if they are parallel resistors. Any alternating-current variations, such as the ripple frequency of the input supply that is not filtered out by filter 106, appears across these resistors and causes a regenerative effect. It should be noted that this spurious or parasitic frequency originally appeared across the load 108 and was fed back through error-detector transistor 47 and regulating transistor 44. These variations are coupled through capacitor 46 to the base of transistor 52. Transistor 52 in turn inverts these variations 180 degrees in phase and "feeds" them to resistor 75. The "fed-back" variations are thus 180 degrees out-of-phase with the variations appearing across the load and have the effect of cancelling the load voltage variations. Thermistors 48 and 76 provide temperature stabilization. The feedback is called "rate feedback" because it operates on the incremental or rate change of voltage appearing across the parallel combination of resistors 18 and 45. This rate feedback feature serves to stabilize the regulator in accordance with the over-all stability and efficiency objectives of the present invention.

Although the foregoing description is directed to only a three-phase regulated rectifier, it should be easily seen that the same principles may be applied to a single phase regulated rectifier merely by having a single control rectifier serially disposed between the source and load and switched in the manner described. A single transistor may be used as a square wave generator 112 while a single capacitor may be used as a ramp generator 113. Two diodes suffice in the diode matrix 114. Each of the other features remain as shown on FIG. 2.

Since changes may be made in the above described arrangement and different embodiments may be devised by those skilled in the art without departing from the spirit and scope of the invention, it is to be understood that all matter contained in the foregoing description and accompanying drawings is illustrative of the principles of the invention and is not to be construed in a limiting sense.

What is claimed is:

1. A power supply comprising a bistable device having high and low states of conduction, a load, a source of potential, means serially connecting said source, said bistable device and said load, first, second and third function generators, means responsive to load voltage variations, means connecting said first function generator to said source of potential and said second function generator to drive said second function generator in accordance with input source variations, means connecting said second function generator and said load voltage responsive means to said third function generator to drive said third function generator in accordance with said second function generator and said load voltage responsive means, and means connecting said third function generator to said bistable device whereby the state of conduction of said bistable device is controlled in accordance with load voltage and potential source variations.

2. A power supply in accordance with claim 1 wherein said load voltage responsive means includes feedback means to stabilize said responsive means in the event of parasitic input source and load voltage variations.

3. A three-phase power supply comprising first, second, and third bistable devices each having high and low states of conduction, a load, a source of three-phase potential, means serially connecting one of said bistable devices between each phase of said source of potential and said load, first, second and third function generators, means responsive to load voltage variations, means connecting said first function generator to said source of three-phase potential and said second function generator to drive said second function generator in accordance with input source variations, means connecting said second function generator and said load voltage responsive means to said third function generator to drive said third function generator in accordance with said second function generator and said load voltage responsive means, and means connecting said third function generator to each of said bistable devices whereby the state of conduction of each of said bistable devices is controlled in accordance with load voltage and potential source variations.

4. A power supply in accordance with claim 3 wherein said load voltage responsive means includes feedback means to stabilize said responsive means in the event of parasitic input source and load voltage variations.

5. A three-phase power supply comprising an input source of three-phase potential, first, second and third bistable devices, a load, means serially connecting each of said bistable devices between each of said phases and said load, a first and second square wave generator, a ramp function generator, an asymmetrically conducting device matrix, a rate feedback network, an error detector, a regulator for controlling the slope of the output of said ramp function generator, means for coupling said first square wave generator to said three-phase source, means connecting said ramp function generator to said first square wave generator, means connecting said error detector to said load to detect variations of load voltage from a reference potential, means connecting said regulator to said error detector, means connecting said rate feedback network to said error detector and said regulator to stabilize said regulator and said error detector in the event of parasitic input source and load voltage variations, means connecting said regulator and said ramp function generator to said asymmetrically conducting device matrix, means connecting said second square wave generator to said asymmetrically conducting device matrix, and means connecting said second square wave generator to each of said bistable devices whereby the state of conduction of each of said bistable devices is determined by said regulator and said three-phase source.

6. A power supply comprising a bistable device having a high and a low state of conduction, a source of alternating-current potential, a load, means serially connecting said source of potential, said bistable device and said load, first and second switching means, an energy storage element, means for coupling said source of alternating potential to said first switching means to determine the switching rate of said first switching means in accordance with said alternating potential, means connecting said first switching means to said energy storage means, means responsive to load voltage variations for determining the storage rate of said energy storage means when said first switching means is conductive, and means connecting said second switching means to said load voltage responsive means, said energy storage means, and said bistable device, whereby said second switching means is rendered conductive and in combination with said source of alternating-current potential determines the state of conduction of said bistable device when said storage rate falls to a predetermined value.

7. A power supply in accordance with claim 6 wherein said load voltage responsive means includes rate feedback means to stabilize said responsive means in the event of input source and load voltage variations.

8. A three-phase power supply comprising first, second and third bistable devices each having high and low states of conduction serially connected between each phase of an alternating-current supply and a load, first, second, third, and fourth switching means, first, second, and third energy storage elements, means for coupling said source of potential to said first, second, and third switching means to determine the switching rate of said first, second, and third switching means, means connecting each of said first, second, and third switching means to each of said first, second, and third energy storage elements, respectively, means responsive to load voltage variations for determining the storage rate of said first, second, and third energy storage means when said first, second, and third switching means are respectively conductive, means connecting said fourth switching means to said load voltage responsive means, to each of said first, second, and third energy storage means, and to each of said first, second, and third bistable devices whereby said fourth switching means is rendered conductive and one of said bistable devices is switched to the high stage of conduction when said storage rate of each of said first, second, and third energy storage devices falls to a predetermined value.

9. A power supply in accordance with claim 8 wherein said load voltage responsive means includes rate feedback means to stabilize said responsive means in the event of input source and load voltage variations.

10. A power supply comprising a controlled rectifier having anode, cathode, and gate electrodes, a source of alternating-current potential, a load, means serially connecting said source of alternating-current potential, the anode and cathode electrodes of said controlled rectifier, and said load, first and second transistors each having base, emitter, and collector electrodes, a capacitor, first and second asymmetrically conducting devices, means connecting the base and emitter electrodes of said first transistor to said alternating-current source, means serially connecting said collector electrode of said first transistor, said capacitor, said first asymmetrically conducting device and the base electrode of said second transistor, means responsive to load voltage variations, means connecting said load voltage responsive means to the base electrode of said second transistor, means including said second asymmetrically conducting device connected to said capacitor and the collector electrode of said first transistor to discharge said capacitor when said first transistor is nonconducting, means connecting the emitter electrode of said second transistor to said second asymmetrically conducting device, and means connecting the collector electrode of said second transistor to the gate electrode of said controlled rectifier whereby the state of conduction of said controlled rectifier is controlled in accordance with said alternating-current source and load voltage variations.

11. A power supply in accordance with claim 10 wherein said means including said second asymmetrically conducting device for discharging said capacitor comprising a resistor.

12. A three-phase power supply comprising first, second and third controlled rectifiers each having anode, cathode, and gate electrodes, a source of alternating-current potential having first, second, and third phases, a load, means individually and serially connecting each of said phases of said alternating-current source, the anode and cathode electrodes of each of said controlled rectifiers, and said load, respectively, first, second, third, and fourth transistors each having base, emitter, and collector electrodes, first, second and third capacitors, first, second, third, fourth, fifth, and sixth asymmetrically conducting devices, means for connecting the base and emitter electrodes of each of said first, second, and third transistors to an individual phase of said alternating-current source, means for serially and individually connecting the emitter electrode of each of said first, second, and third transistors, said first, second, and third capacitors, said first, second, and third asymmetrically conducting devices, and the base electrode of said fourth transistor respectively, means responsive to load voltage variations, means connecting said load voltage responsive means to base electrode of said fourth transistor, means including said fourth, fifth, and sixth asymmetrically conducting devices for individually discharging each of said first, second, and third capacitors when each of said first, second, and third transistors are nonconductive, respectively, means connecting the emitter electrode of said fourth transistor to each of said fourth, fifth, and sixth asymmetrically conducting devices, respectively, and means connecting the collector electrode of said fourth transistor to the gate electrode of each of said first, second, and third controlled rectifiers whereby the state of conduction of each of said first, second and third controlled rectifiers is controlled in accordance with said alternating-current source and load voltage variations.

13. A three-phase power supply in accordance with claim 12 wherein said means including said fourth, fifth and sixth asymmetrically conducting devices for discharging said first, second and third capacitors comprises first, second, and third resistors.

14. A regulator comprising a serially connected source of potential, a regulating element, and a load, means connected to said regulating element for controlling said regulating element comprising energy storage means, means for controlling the storage rate of said energy storage means comprising a variable impedance serially connecting said energy storage means to said load, a source of reference potential, means responsive to the difference between the voltage appearing across said load and said reference voltage connected to said impedance element to control the impedance of said impedance element, inverting means, means responsive to parasitic variations in said energy storage rate, means for coupling said parasitic variation responsive means to said inverting means, and means for connecting said inverting means to said difference responsive means whereby said parasitic variations are eliminated.

15. A regulator in accordance with claim 14 wherein said coupling means comprises a capacitor and said inverting means comprises a transistor.

16. A three-phase power supply comprising first, second and third controlled rectifiers each having anode, cathode and gate electrodes, a source of alternating-current potential having a first, second, and third phase, a load, means for serially individually connecting the anode and cathode electrodes of each of said first, second, and third controlled rectifiers between each of said first, second and third phases of said alternating-current source and said load respectively, first, second, third, and fourth transistors each having base, collector and emitter electrodes, first, second and third capacitors, first, second, third, fourth, fifth, and sixth asymmetrically conducting devices, means for coupling the base and emitter electrodes of each of said first, second, and third transistors to each of said first, second, and third phases of said alternating-current source respectively, means for serially connecting in individual paths the collector electrodes of each of said first, second, and third transistors, said first, second, and third capacitors, said first, second, and third asymmetrically conducting devices and the base electrode of said fourth transistor, respectively, means for controlling the storage rate of said first, second, and third capacitors comprising a variable impedance serially connecting each of said first, second and third capacitors to said load, a source of reference potential, means responsive to the difference between the voltage appearing across said load and said reference potential for controlling said impedance element, inverting means, means responsive to parasitic variations in said energy storage rate of each of said first, second and third capacitors, means for connecting said parasitic variation responsive means to said inverting means, means for connecting said inverting means to said load voltage reference-potential difference responsive means, means for connecting said impedance means to the base electrode of said fourth transistor, first, second and third resistors, means for serially connecting in individual discharge paths said first, second and third capacitors, said first, second and third resistors and said fourth, fifth and sixth asymmetrically conducting devices, means including said first, second and third resistors, respectively, for connecting the emitter electrode of said fourth transistor to the collector electrodes of said first, second and third transistors, a differentiating network, means for connecting the collector electrode of said fourth transistor to said differentiating network, a blocking oscillator, means for connecting said blocking oscillator to said differentiating network, and means for connecting the output of said blocking oscillator to the gate electrodes of each of said first, second, and third controlled rectifiers whereby the state of conduction of each of said first, second and third controlled rectifiers is controlled in accordance with said alternating-current source and load voltage variations.

References Cited by the Examiner

UNITED STATES PATENTS

| 2,630,557 | 3/1953 | Bixby | 321—18 |
| 3,005,143 | 10/1961 | Thomas | 321—18 |
| 3,005,946 | 10/1961 | Thompson | 323—24 |
| 3,114,097 | 12/1963 | Clarke | 321—18 |

FOREIGN PATENTS 756,180  8/1956  Great Britain.

OTHER REFERENCES

Hewlett-Packard Journal, vol. 13, No. 11 (published Judw 1962), pp 1–8.

Marconi Review, vol. XXV, No. LXX (published first quarter 1962), pp. 81–101.

JOHN F. COUCH, *Primary Examiner.*

LLOYD McCOLLUM, *Examiner.*

K. HADLAND, K. D. MOORE, *Assistant Examiners.*